No. 791,394. PATENTED MAY 30, 1905.
A. T. ANDERSON.
LATHE APPLIANCE.
APPLICATION FILED OCT. 18, 1904.

3 SHEETS—SHEET 1.

No. 791,394. PATENTED MAY 30, 1905.
A. T. ANDERSON.
LATHE APPLIANCE.
APPLICATION FILED OCT. 18, 1904.

3 SHEETS—SHEET 2.

No. 791,394. PATENTED MAY 30, 1905.
A. T. ANDERSON.
LATHE APPLIANCE.
APPLICATION FILED OCT. 18, 1904.

3 SHEETS—SHEET 3.

Witnesses
Sidney P. Hollingsworth
C. B. Bull

Inventor
Alfred T. Anderson

By
Geo. W. T. Mail
Attorneys

No. 791,394.                                           Patented May 30, 1905.

UNITED STATES PATENT OFFICE.

ALFRED T. ANDERSON, OF AURORA, INDIANA.

LATHE APPLIANCE.

SPECIFICATION forming part of Letters Patent No. 791,394, dated May 30, 1905.

Application filed October 18, 1904. Serial No. 229,001.

*To all whom it may concern:*

Be it known that I, ALFRED T. ANDERSON, a citizen of the United States, residing at Aurora, in the county of Dearborn and State of Indiana, have invented new and useful Improvements in Lathe Appliances, of which the following is a specification.

This invention relates to improvements in lathe appliances, and has special reference to center drills or grinders, the object being to provide a simple device by the use of which the drill or grinding or polishing disk may be easily adjusted to work at any desired height or angle.

The object is attained in the mechanism illustrated in the accompanying drawings; and the invention consists in certain novel features of the same, as will be hereinafter first fully described, and then particularly pointed out in the claims.

Figure 1:
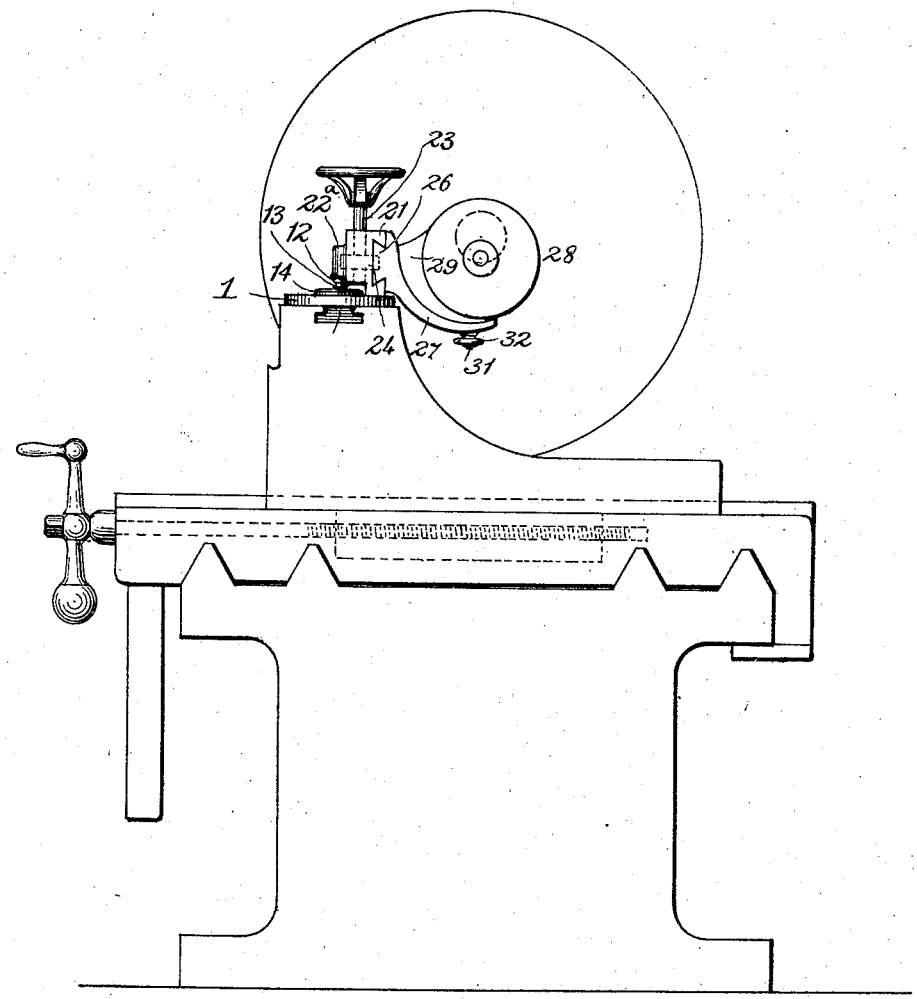
Figure 2:
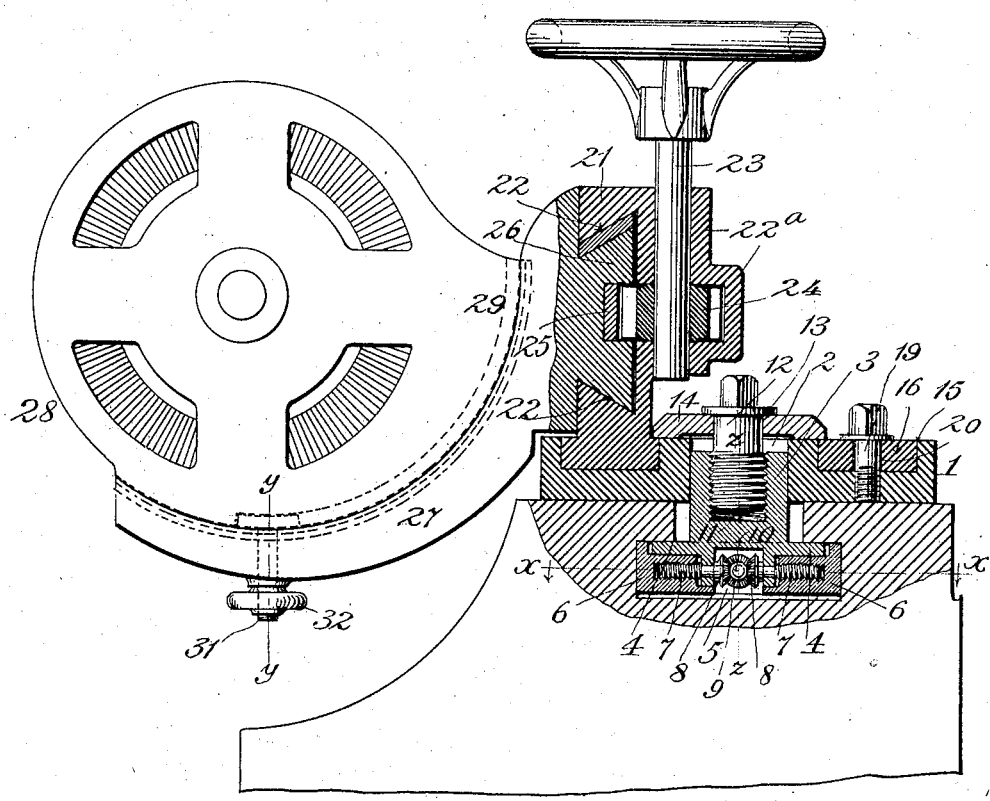
Figure 3:
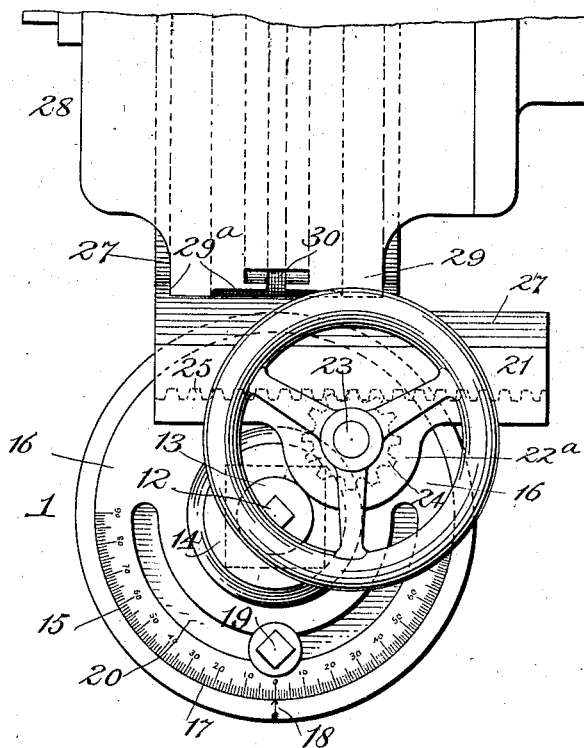
Figure 4:
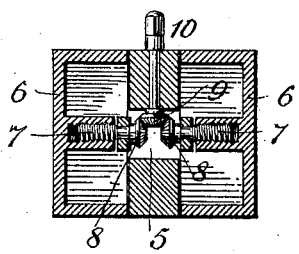
Figure 5:
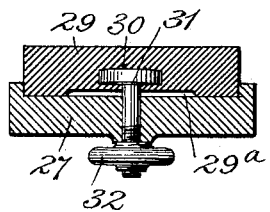
Figure 6:
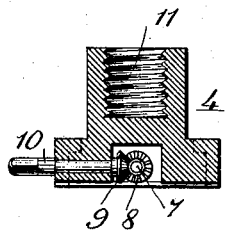

In the drawings, which show the preferred embodiment of the invention, Figure 1 is an end view of the device in position on the lathe. Fig. 2 is an enlarged view of the device, showing parts in elevation and parts in vertical section. Fig. 3 is a plan view of the device. Fig. 4 is a detail horizontal section on the line $x$ $x$ of Fig. 2. Fig. 5 is a detail vertical section on the line $y$ $y$ of Fig. 2, and Fig. 6 is a detail vertical section on the line $z$ $z$ of Fig. 2.

In carrying out my invention I employ a base-plate 1, adapted to rest on the carriage of the lathe and which is provided with a central angular opening 2, which registers with the T-slot in the carriage when the device is in its operative position. Fitted in this opening is an angular post 3, having lateral horizontal arms 4 at its lower end and provided with a central recess 5 between the said arms. Slidably mounted on these arms are clamping-jaws 6, having internally-threaded bores which are engaged by feeding-screws 7, having pinions 8 on their inner ends, which pinions mesh with a pinion 9 on the inner end of a shaft 10, journaled in the lower end of the post 3 and having its outer end adapted to be engaged by a key or wrench. The upper portion of the post 3 is internally threaded, as shown at 11, and is engaged by a clamping-screw 12, which passes up through the opening 2 in the base-plate and is provided with an annular rib or shoulder 13, bearing upon a washer 14, which rests upon the base-plate and extends over the central opening therein, as clearly shown. The upper end of this clamping-screw is angular, so that it may be engaged by a wrench or key.

When the device is to be secured in position, the post is slipped laterally through the end of the T-slot in the lathe-carriage, with the jaws 6 fitting in the horizontal portion of the said slot and the base-plate resting on the upper side of the carriage. The shaft 10 is then rotated, so as to impart motion to the screws 7 through the intermeshing pinions 8 and 9, and thereby cause the jaws 6 to be fed outwardly against the end walls of the lower horizontal portions of the T-slot. The screw 12 is then rotated, so as to carry the washer 14 downward against the base-plate, and consequently to clamp the base-plate to the carriage, as will be readily understood.

In its upper side the base-plate is provided with an annular groove 15, in which is fitted a ring 16, having a series of graduations 17 on its upper side which facilitate an accurate adjustment of the device to work at any desired angle by moving past or registering with an index or pointer 18, marked on the upper surface of the base-plate. The ring is secured in its adjusted position by a set-screw 19, mounted in the base-plate and passing through a slot 20, formed in the ring concentrically with the sides of the same. The upper portion of the screw bears upon the top of the ring, so as to bind it upon the base-plate, as will be readily understood. Rising from and integral with the ring 16 and on the opposite side of its center from the graduations 17 and the slot 20 is a beam 21, which extends horizontally beyond the edge of the ring and is provided with a dovetailed horizontal groove 22 in one side and with an offset 22$^a$ on its opposite side. Mounted in this offset is a vertical shaft 23, carrying a handwheel on its upper end and a pinion 24 near its lower end. The pinion 24 meshes with a rack-bar 25, formed on the dovetailed rib 26, constituting the back of a bracket which supports the casting within which the drill or grinder is mounted. The dovetailed rib fits in the dovetailed groove 22 and the main portion of the bracket extends downward and outward therefrom in a curved arm 27, upon which the casting or casing 28 is secured. The casing 28 is a hollow cylindrical casting having an eccentric rib 29 on one side which fits in a groove 29ª in the upper surface of the supporting-arm 27, and is provided with a T-shaped slot 30, adapted to engage the shank and head of a bolt 31, which is mounted in an opening in the curved supporting-arm and carries a clamping-nut 32 on its lower end, which is adapted to be turned up against the under side of the said arm to secure the casing at any desired point. The tool-carrying shaft is mounted centrally within the casing or casting 28 and forms the armature of an electric motor secured therein. On the end of the shaft beyond the end of the casing is secured a drill, a cutter, an emery disk, or other tool according to the work to be accomplished. The particular construction of the motor forms no part of my present invention, and I have therefore only outlined the same in the drawings.

When it is desired to grind a center on a lathe fitted with my device, the base-plate 1 is secured on the carriage, as hereinbefore described, and the ring 16 adjusted so that the zero-mark thereon is in alinement with the index 18 on the base-plate. The casting 28 is adjusted to its lowest position by bringing the narrowest portion of the rib 29 around to the bolt 31, which is the position illustrated. If it be desired to grind above the center, the casting is manually shifted upon the supporting-arm, so as to bring the thicker portion of the rib 29 toward the outer edge or end of the curved supporting-arm, which will of course elevate the casting with respect to its support. When the desired adjustment has been attained, the nut 32 is turned home, so as to securely fasten the parts in the adjusted position. It will be understood that when the nut 32 is loose the casing or casting 28 may be rotated with a sliding movement on the arm 27 and the head of the bolt 31 toward or away from the outer end of the arm. When the nut is turned home, however, the arm and the casing will be clamped together between the nut and the head of the bolt, as will be readily understood on reference to Fig. 5. If it be desired to grind at an angle, the ring 16 is shifted around the center of the base-plate until the mark denoting the desired angle registers with the index, when the set-screw 19 is turned home, so as to secure the ring firmly in its adjusted position. The drill or other tool is moved to or from the work by properly manipulating the shaft 23, as will be understood.

It will be seen from the foregoing description, taken in connection with the accompanying drawings, that I have provided a device of very simple construction by which the tool may be set to work at any desired angle and may be adjusted without stopping the work. It will be found very advantageous when polishing articles having surfaces of irregular contour or varying angles.

I do not restrict myself to the exact details of construction, combination, and arrangement herein set forth, it being obvious that minor variations thereof not involving the exercise of invention may be made by the skilled mechanic, and such departures from what is herein described and claimed not involving invention I consider as within the scope and terms of my claims.

Having thus described my invention, I claim—

1. In a lathe appliance, the combination of a curved supporting-arm, a motor-casing having an eccentric rib engaging the said arm, and means for securing the casing to the arm at any desired point of the eccentric rib.

2. The combination in a lathe appliance, of a curved supporting-arm having a groove in its upper side, a motor-casing mounted on said arm and provided with an eccentric rib engaging the said groove, and means for adjustably securing the rib within the groove, substantially as set forth.

3. The combination in a lathe appliance of a curved supporting-arm having a groove in its upper side, a motor-casing resting on the arm and having an eccentric rib engaging the said groove, the said rib having a T-shaped longitudinal slot, a bolt mounted in the supporting-arm and having its head engaged by the said T-shaped slot in the eccentric rib, and a thumb-nut on the lower end of the bolt adapted to be turned home against the supporting-arm, substantially as set forth.

4. The combination of a base-plate, a beam carried thereby and adjustable concentrically thereon, a bracket supported by said beam and longitudinally adjustable thereon, and a motor-casing adjustably secured upon said bracket.

5. The combination in a lathe appliance of a base-plate having a circular groove in its upper side, a ring set in said groove and adjustably secured therein, a beam rising from said ring to one side of the center thereof, a bracket carried by said beam, and a motor-casing mounted on said bracket and adjustably secured thereto, substantially as set forth.

6. The combination in a lathe appliance of a base-plate having a circular groove in its upper side, a ring fitted in said groove and provided with a concentric slot, a set-screw mounted in the base-plate and passing through said slot to secure the ring in an adjusted position, a bracket carried by said ring, and a motor-casing adjustably mounted on said bracket, substantially as set forth.

7. The combination in a lathe appliance of a base-plate having a central opening, a post mounted in said opening and adapted to pass into the slot in the lathe-carriage, a washer resting on the base-plate and extending over the said opening, a screw swiveled on said washer and engaging the post, clamping-jaws on the lower end of the post, and means for operating said clamping-jaws to cause them to bind against the walls of the slot in the lathe-carriage, substantially as set forth.

In testimony whereof I affix my signature in presence of two witnesses.

ALFRED T. ANDERSON.

Witnesses:
FRANK B. SHUTTS,
CLARENCE J. ANDERSON.